INVENTOR.
DEXTER P. COOPER, JR.
BY
BROWN and MIKULKA
and
JAMES E. MROSE
ATTORNEYS INVENTOR.
DEXTER P. COOPER, JR.
BY BROWN and MIKULKA
and
JAMES E. MROSE
ATTORNEYS INVENTOR.
DEXTER P. COOPER, JR.
BY
BROWN and MIKULKA
and
JAMES E. MROSE
ATTORNEYS INVENTOR.
DEXTER P. COOPER, JR.
BY BROWN and MIKULKA
and
JAMES E MROSE
ATTORNEYS United States Patent Office 3,443,023

Patented May 6, 1969

3,443,023

TWO-COLOR LINE-SEQUENTIAL COLOR TELEVISION

Dexter P. Cooper, Jr., Lexington, Mass., assignor to Polaroid Corporation, Cambridge, Mass., a corporation of Delaware Filed Feb. 7, 1966, Ser. No. 525,761
Int. Cl. H04n *1/46, 9/12*
U.S. Cl. 178—5.2 26 Claims

ABSTRACT OF THE DISCLOSURE

A two-color television system utilizing a ternary interlaced line-sequential scanning arrangement. The lines are traced in a sequence of two lines in one color followed by one line in the second color. For instance, in a red-white system, the lines may be traced in a red-red-white sequence. The ternary sequence may be reversed for compatible black-and-white reproduction to trace the lines in a white-white-red sequence.

The present invention relates to improvements in the production of displays in color, and, in one particular aspect, to novel and improved compatible color television practices and apparatus involving unique and advantageous reproductions of color-separation images by two emissions from phosphors which are economically and simply arranged and which have their emissions modulated on a line-sequential basis in a predetermined order promoting improved color resolutions in the resulting color displays.

In conformity with classical theories relating to color and its perception, reproductions of subjects in color have been approached routinely by resolving discrete incremental areas of the broad-area subject in terms of three primary-color components and by attempting to duplicate, as closely as possible, each of these discrete incremental areas with the same primary colors in the same proportions. Conventional three-color television systems provide a typical example of this straightforward point-by-point approach; there, each element of a scene is separately viewed by three cameras each responding to a different one of its three (red, green and blue) primary-color contents, and, at a receiving site, electrical signals characterizing the camera detectings for each point in the scene are translated into excitations of one or more of three phosphors (respectively emitting red, green and blue light) which serve a corresponding elemental area of the picture tube screen. Typically, viewing-screen phosphors comprise minute dots arrayed in triangular clusters of three, and electron beams from three guns slaved with different ones of the three cameras are guided through a high-precision apertured shadow mask to impinge upon the different phosphor dots and thereby cause each emission of a different-color light from each of them to be in as direct a relation as possible to the amount of that same color which is present at a corresponding point in the televised scene. Successful commercialization of equipment involving the highly intricate and critical aperture-mask and dot-array assemblies has acclaimed the remarkable engineering and production triumphs which they represent; nevertheless, the inevitable search for greater economy, lesser criticality, increased brightness, and better quality has also continued and has led to a number of proposals which, in particular, would obviate the need for these highly complex mask and dot-cluster features. Multi-stripe and multiple-layer picture tube screens have been thought to be promising alternatives, with the latter holding the great attraction that each of the three light-emitting materials needed to produce a different one of the primary colors may be introduced as a separate and substantially continuous broad-area layer of film near the face of a picture tube. Through proper selection of screen materials and control of electron-accelerating potentials and/or beam currents, each of the layers may theoretically be excited into emission of a different primary-color light output which should serve to recreate the televised scene in full natural colors. As a practical matter, it is difficult to realize and maintain accurate color matching because colors from the three layers must be generated and viewed in just the right proportions or ratios so that they will combine in each elemental area to reproduce the same resulting color as that at a related point in the televised scene. Moreover, the high-frequency modulations of accelerating potentials which are required to effect color changes at rapid rates in such layered picture tubes tend to produce serious radiation problems.

It has also been known heretofore that certain advantages may be realized through exploitation of the phenomenon that colors perceived in the field of an image are evidently dependent upon the interplay of its longer and shorter wavelengths, without narrow limitation to those specific wavelengths of the Newtonian spectrum with which colors are classically identified. Recognitions based upon this phenomenon have permitted televising in multiple colors through translations involving less than the usual three color codes, and, specifically, by way of picture tubes which emit visible light of but two distinctive bands of wavelengths. In one convenient practice, for example, the screen of a picture tube may involve but two phosphors capable of emitting light of essentially reddish and greenish wavelengths, respectively, and which may be scanned by electrons such that they are either excited into emissions separately, or, alternatively, one and both are excited into emissions separately, in response to control signals characterizing the respective lightness-distributions in a televised scence being viewed through two different filters. Currently-preferred fabrications involve either the use of two phosphors which may be deposited in coextensive layers to form the screen, or, alternatively, a substantially homogeneous screen comprised of discrete juxtaposed amounts of the two phoshors (example: grains of one phosphor each carrying a coating by the other). Modulations of the kinetic energies of the impinging electrons (via control of accelerating potentials) provide an advantageous practice for modulations of the light emissions from the two phosphors when they either inherently emit or are artificially caused to emit differently under different accelerating-potential conditions. However, the levels and spacing between levels of needed accelerating potentials, and the electrical power involved, militate against color modulations on a high-frequency (typically 3.58 megacycles) dot-sequential basis; radiation problems alone necessitate the use of troublesome and costly thorough shielding, for example. Line- or field-sequential modulations, at significantly reduced rates, would appear to be more attractive for that reason, and for the further reason that they better lend themselves to tape recording, except that routine application of existing concepts renders the color receiver susceptible to certain highly objectionable visual effects. Specifically, field-sequential scanning to produce different colors in the alternate frames tends to develop disturbing flicker. And, in line-sequential scanning, the vertical color resolution tends to be relatively coarse, with consequent prominent horizontal bands or lines being discernible, and, moreover, the displays tend to exhibit annoying line-crawl or "waterfall" effects.

In accordance with the present teachings, however, important improvements in the production of displays involving essentially two color emissions may be realized through uniquely-programmed scanning on a line-sequential basis, the color emissions being caused to be the same during two successive line scans and different during the third, for each of the interlaced fields in each frame. The resulting frames advantageously define the desired multi-color impressions in terms of repeated closer patterns of three successive horizontal lines, two of which have the same wavelengths of emissions and the third of which involves different wavelengths. These groups of three adjacent lines serve to define the color as perceived by the viewer, and the color resolution is superior to that which would exist were the expected minimum groupings of four lines involved instead. In the improved ternary system, the odd number of lines, divisible by three, constituting the total linework of a full picture (commonly 525 lines), advantageously lend themselves to cyclic repetition of the same color coding, without alteration of the sequencing.

It is one of the objects of this invention, therefore, to improve the color resolution and stability of displays in color television through uniquely-programmed scannings which excite visible emissions having but two distinctive wavelength contents.

Another object is to provide novel and improved color television apparatus of uncomplicated low-cost construction in which substantially full and agreeable color reproductions are produced through excitations of but two phosphors on a unique ternary line-sequential basis which promotes high-quality color resolutions.

A further object is to provide advantageous multi-color television displays in which two differently-emitting phosphors are stimulated into emissions distinctively by electrons having their accelerating potentials modulated in accordance with a ternary coding sequence wherein the accelerating potential is cyclically maintained at one level during two successive line scans and at a different level during a third line scan.

Still further, it is an object to provide two-color line-sequential television receivers of economical construction which are capable of producing pleasing and stable multi-color impressions having high-quality color resolutions and which are compatibly operable to reproduce black-and-white images, from conventional color and black-and-white transmissions, respectively.

In addition, it is an object to provide unique and advantageous color television receiver apparatus wherein two screen phosphors are excited to develop emissions of substantially red and substantially white light by line-sequentially coordinated modulations of scanning electron-beam velocities which cause lines to be traced in a red-red-white sequence, and wherein the tone of compatible black-and-white reproductions may be readily compensated for inherent coolness by convenient shifting to a white-white-red sequence.

By way of a summary account of practice of this invention in one of its aspects, the scenes viewed by camera equipment of a television transmitting station are translated into at least two separate lightness-distribution images by way of different optical filters, such as red and green filters, and each of these images is in turn processed by a different image orthicon tube to produce different characterizing electrical signals. At a receiving site, these electrical signals are duplicated for purposes of controlling an electron beam which scans a picture-tube screen target assembly including an inner layer of red-emitting phosphor superimposed coextensively upon an outer faceplate-supported layer of green-emitting phosphor. Electron-accelerating potentials of two different levels are applied to an accelerating anode element of the picture tube from a source which is programmed to deliver, cyclically, a relatively low potential during times when two successive lines are being scanned and a relatively high potential when the third successive line is being scanned. The relatively low potential is at predetermined level sufficient to excite the inner layer into emissions of reddish light, while leaving the outer layer substantially unexcited, and the relatively high potential is at a predetermined level sufficient to excite both layers into visible emissions simultaneously, thereby yielding a resulting substantially whitish or achromatic light output. Synchronously, the scanning electron beam intensity is controlled in accordance with lightness-distribution information in the televised scene as viewed through the red filter while the relatively low accelerating potential persists, and in accordance with lightness-distribution information in the televised scene as viewed through the green filter while the relatively high accelerating potential persists. Importantly, the resulting perceptions of multiple colors in the reproduced scene are established by relatively fine interlaced groupings of but three lines (traced in red, red and white light outputs) and the color resolution is thus of relatively high quality. Flicker and line-crawl effects are not promoted, despite absence of provisions for permanently synchronizing any particular line with a particular color emission.

Although the features of this invention which are considered to be novel are expressed in the appended claims, further details as to preferred practices of the invention, as well as the further objects and advantages thereof, may be most readily comprehended through reference to the following description taken in connection with the accompanying drawings, wherein:

FIGURE 1 represents an improved color television system embodying certain of the present teachings, in part in block-diagram and in part in schematic forms;

FIGURE 2 portrays in gross and exaggerated forms the improved ternary line-sequential scanning at the face of a binary color-coded picture tube, the scans being interrupted to distinguish those of alternate interlaced fields;

Figures 6, 7, 8:
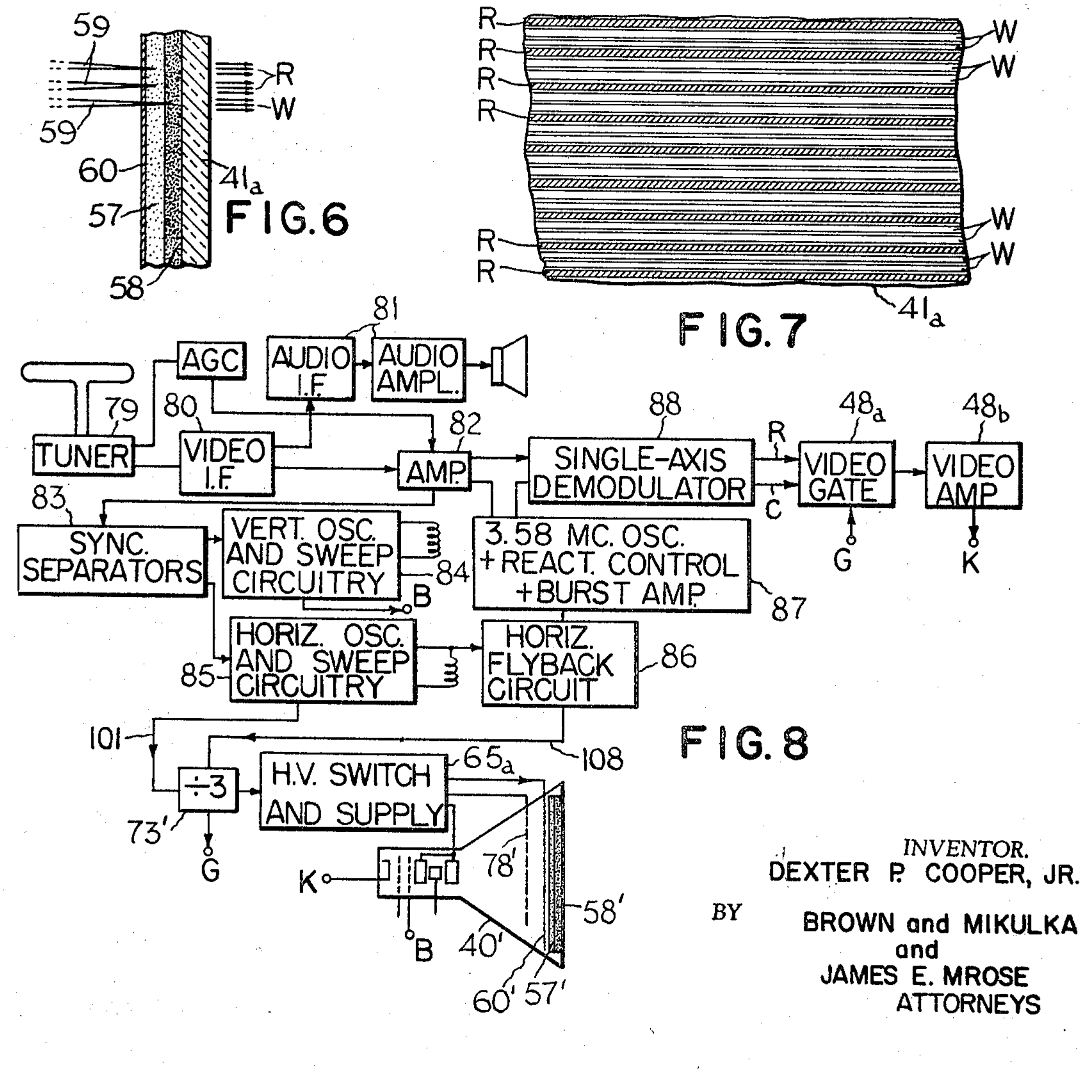
Figure 9:
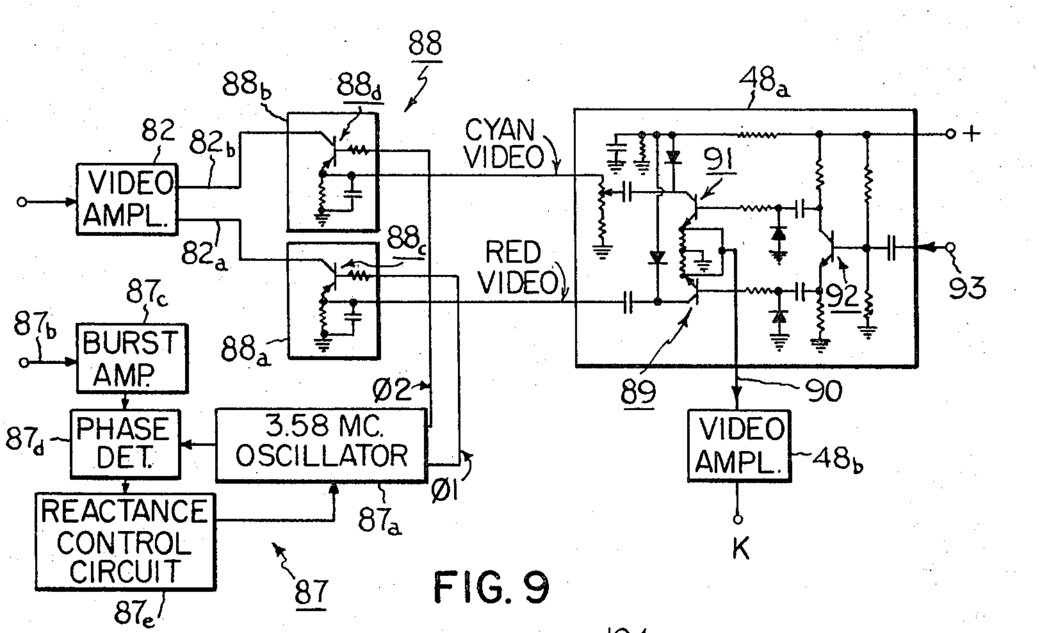
Figure 10:
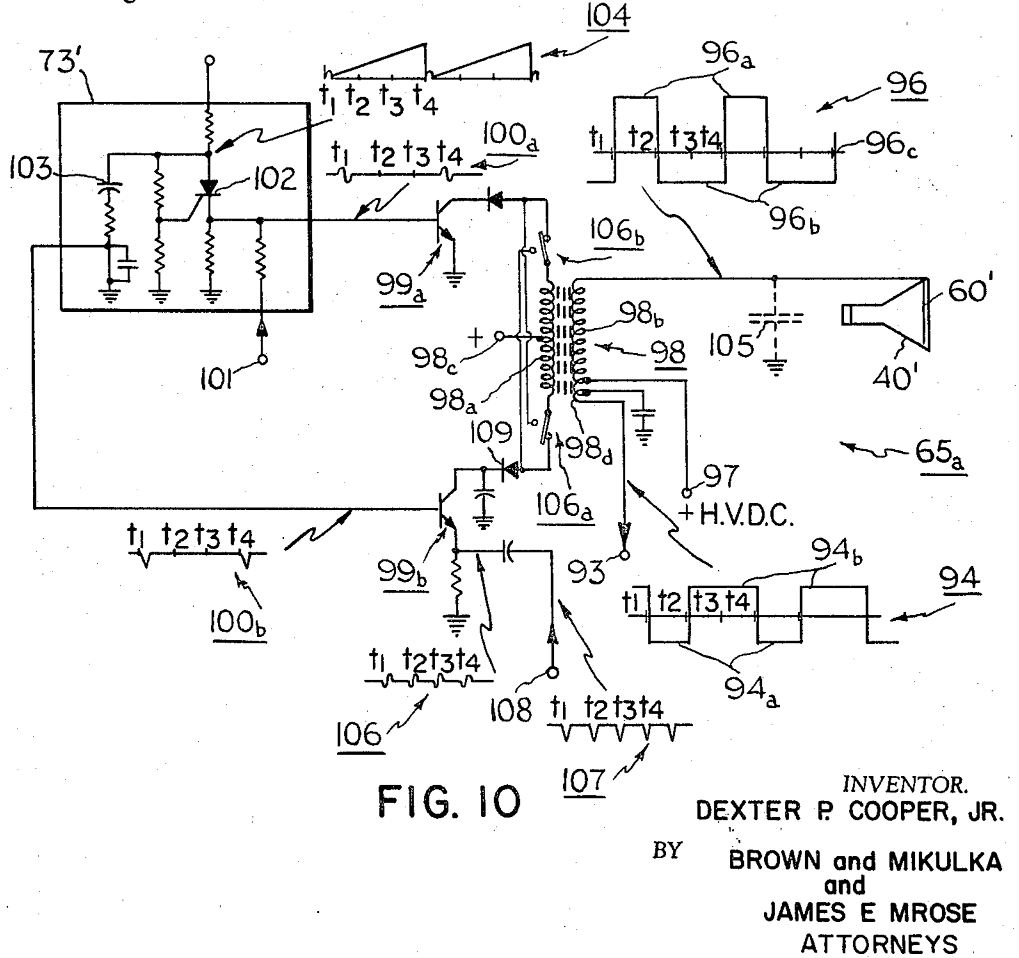

FIGURE 6 provides a transverse cross-section of a fragment of a layered picture tube target and face, together with symbolic representations of electron beam penetrations and resulting light emissions;

FIGURE 7 illustrates a fragment of a binary color-coded picture tube face evidencing unique ternary line-sequential scanning for improved black-and-white reproductions;

FIGURE 8 provides a color television receiver diagram, in block and schematic conventions, which exploits circuitry specially suited to excitation of a binary color-coded picture tube for ternary line-sequential scanning;

FIGURE 9 provides schematic details of single-axis demodulator and video gating circuitry useful in the receiver system of FIGURE 8; and FIGURE 10 provides schematic details, together with related waveforms, for high-voltage and gating switch circuitry useful in the receiver system of FIGURE 8.

Figure 1:
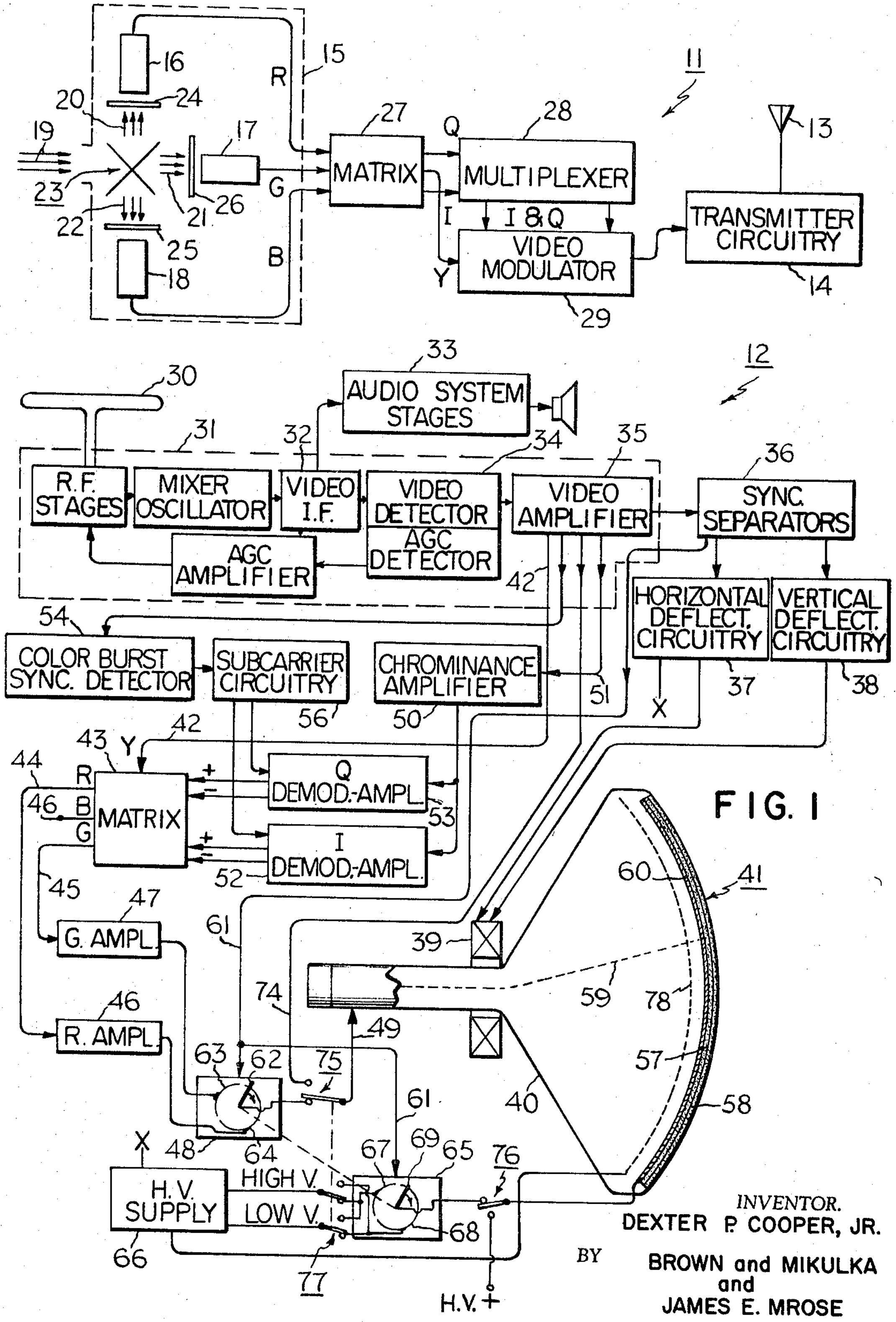

The embodying arrangement portrayed in FIGURE 1 includes color television transmitting and receiving apparatus, 11 and 12, respectively, which are in generally conventional communication by way of electromagnetic radiations within a prescribed television-frequency channel. Transmitting antenna 13 is excited by transmitter circuitry 14 of known form adapted to deliver an output modulated to contain the customary five components (audio, video, deflection, chrominance and color burst) for the color signals which are to be radiated. Luminance and chrominance aspects of televised scenes are characterized via a camera assembly 15 which includes the usual three image orthicon or equivalent pickup tubes, 16–18, electrically excited in the customary fashion. Light 19 emanating from a televised scene is shown to be optically resolved into three image beams 20–22 by a mirror array 23, and, thereafter, each beam is passed through a different one of three color filters, 24–26, respectively, before being permitted to impinge upon the sensitive surfaces of its associated pickup tube. One of these filters, 24, passes essentially one color component in the scene, such as its red content falling within the reddish (relatively long) wavelengths of light in the Newtonian spectrum; another filter, 25, passes another color component corresponding to distinguishably different wavelengths, such as the blueish (relatively short) wavelengths; and the third filter, 26, passes a further color component corresponding to the intermediate wavelengths, such as those associated with the color green. It will be recognized that these techniques include those commonly practiced in the generation and transmission of the now-conventional NTSC three-color television signals, and this is a distinct advantage from the standpoint of compatibility, although exploitation of the present teachings is not necessarily restricted to televising which involves the conventional red, green and blue filters, or of as many as three filters. Instead, desired effects may be realized when two filters view the scene with wavelengths which are distinguishably different, even though overlapping somewhat. For present purposes, it is important that the resulting color-separation images, which are characterized in terms of different electrical output signals from the camera tubes, are images which exhibit different lightness scales for the same scene. Such different lightness scales are of the type observed when different narrow-band filters are successively held to the eye in viewing a colorful scene. The three conventional-type cameras chosen for illustration produce electrical outputs which are processed by a conventional matrix 27 to produce the standard brightness (I) and chrominance (Q and Y) signals, which are then prepared for transmission by way of a known form of multiplexer 28 and modulator 29.

Within the receiver 12, the high-frequency radiations intercepted by antenna 30 are applied to a conventional embodiment of receiver circuitry 31, and are there resolved into component signals by equipment of types and forms well known in commercial three-color television receivers. Take-off from the video IF stage 32 delivers sound IF to the audio system stages 33, for example, and the video demodulation products from detector 34 are supplied to an amplifier 35. The latter delivers synchronizing signals to sync separators 36 serving the usual horizontal deflection circuitry, 37, and vertical deflection circuitry, 38, which supply the horizontal and vertical deflection coils of the deflection yoke 39 associated with the picture tube 40 having a layered faceplate structure 41. In addition, a coupling 42 applies to a matrix 43 a composite luminance signal (Y) which corresponds to the summation of the brightness of the color signals derived from all three camera tubes; this matrix of course converts applied signals into the usual three electrical output signals corresponding, in channels 44–46, to the red, green and blue color-separation signals developed at the transmitter by the camera tubes 16–18, respectively. Only the output signals in channels 44 (red) and 45 (green) need be used in the illustrated system, however, and amplifiers 46 and 47 prepare these two matrix output signals for application to a gating or switching unit 48, which in turn applies appropriate modulating signals to a control electrode of picture tube 40 via coupling 49. Although they are conventional, it is perhaps helpful at this juncture to refer briefly to the other chrominance circuits which cooperate by supplying information to matrix 43 for the decoding operations. In this connection, it is to be noted that video amplifier 35 applies a chrominance (video modulation) signal to a chrominance amplifier 50 by way of a coupling 51, and that I and Q signal sideband components in quadrature are thence delivered to the I demodulator-amplifier 52 and Q demodulator-amplifier 53 which ultimately supply I- and Q-related output signals to the matrix. For the latter purposes, color burst signals associated with transmitted horizontal blanking pulses are applied to a color burst sync detector 54 from the video amplifier circuitry 35 and control the phase of the local subcarrier oscillator signal developed within the subcarrier circuitry (oscillator-amplifier) 56. An in-phase output from that circuitry is delivered to the I demodulator-amplifier 52, and a 90-degree out-of-phase output is delivered to the Q demodulator-amplifier 53; video I and Q signals are selectively developed as the result of I and Q sideband combinations with the subcarrier outputs with which they are in phase.

The system as thus far described produces two electrical control signals, in the picture tube grid excitation coupling 49, which are closely related to the three lightness-distribution images of the televised scene as viewed through two (red and green) of the camera filters. In causing the picture tube 40 to generate a display of the same scene in substantially full color, the present teachings very advantageously obviate the need for attempting to reproduce the three images in terms of precisely the same colors in which they were viewed. Instead, the lightness distributions in one of the two images, specifically that viewed through green filter 26, are merely characterized in terms of substantially white light at the face of the picture tube, and the lightness distributions in another of the images, specifically that viewed through red filter 24, is characterized in terms of colored light of wavelengths which appear to be substantially reddish. Important practical implications of this practice are evidenced by the picture-tube target assembly 41, which is comprised of essentially two layers, 57 and 58, of light emitting materials. These layers are coextensive with and preferably supported upon the interior of the glass faceplate of the evacuated tube envelope. Innermost layer 57, nearest the electron gun, may comprise a conventional phosphor which emits substantially red visible light in an optimum manner when struck by electrons from beam 59 having a relatively low kinetic energy (i.e. relatively low velocity), as determined by relatively low accelerating potentials applied to the inner conductive (ex. evaporated aluminum) layer 60 which is of a type and form commonly used in picture tube constructions and serves as an accelerating anode. Outer layer 58, nearest the faceplate, efficiently emits light of another predetermined color, such as substantially green or cyan light, when excited by impinging electrons having a relatively high kinetic energy as determined by relatively high accelerating potentials applied to the anode 60. Emissions of reddish light from inner layer 57 occurring simultaneously with emissions of greenish or cyanish light from outer layer 58, during intervals when the higher accelerating potentials are applied, result in substantially whitish light outputs. Consequently, the picture tube is effectively a binary color-coded device, producing substantially red and white outputs; however, the viewers' mind-eye relationships enable their perceptions of multi-color images substantially like those of the televised scene when the picture tube is properly modulated.

As has already been noted hereinabove, gate 48 serves to switch the applied red and green lightness-distribution signals to a control electrode of the picture tube 40, under control of synchronizing signals applied thereto via coupling 61 from the sync separator circuitry 36. In the schematic illustration of gate 48, a switching armature 62 rotated clockwise at the rate of one revolution during each three successive horizontal line scans wipes arcuate contact segments 63 and 64 which occupy substantially one-third and two-thirds, respectively, of the circular contacting span, such that the green-related signals are coupled to the control electrode during one line scan and the red-related signals are coupled to the control electrode during the other two line scans. Electron beam 59 is thus suitably modulated in intensity to characterize the red and green lightness-distribution information in terms of red and white light outputs, respectively, from the screen phosphor layers 57 and 58, provided the accelerating potentials are appropriately varied in synchronism. In the latter connection, the needed relatively high and low accelerating potentials at the anode 60 are produced synchronously by a switch or gate 65 which is generally like gate 48 and is similarly synchronized by signals from coupling 61. High voltage supply 66 normally delivers the high and low accelerating voltages to contact segments 67 and 68, which are wiped by armature 69 and which are of arcuate spans corresponding to those of segments 63 and 64, respectively. Although the commutating by gates 48 and 65 is illustrated schematically in mechanical terms, equivalent gating is preferably achieved electronically by circuitry such as is discussed later herein.

Figure 2:
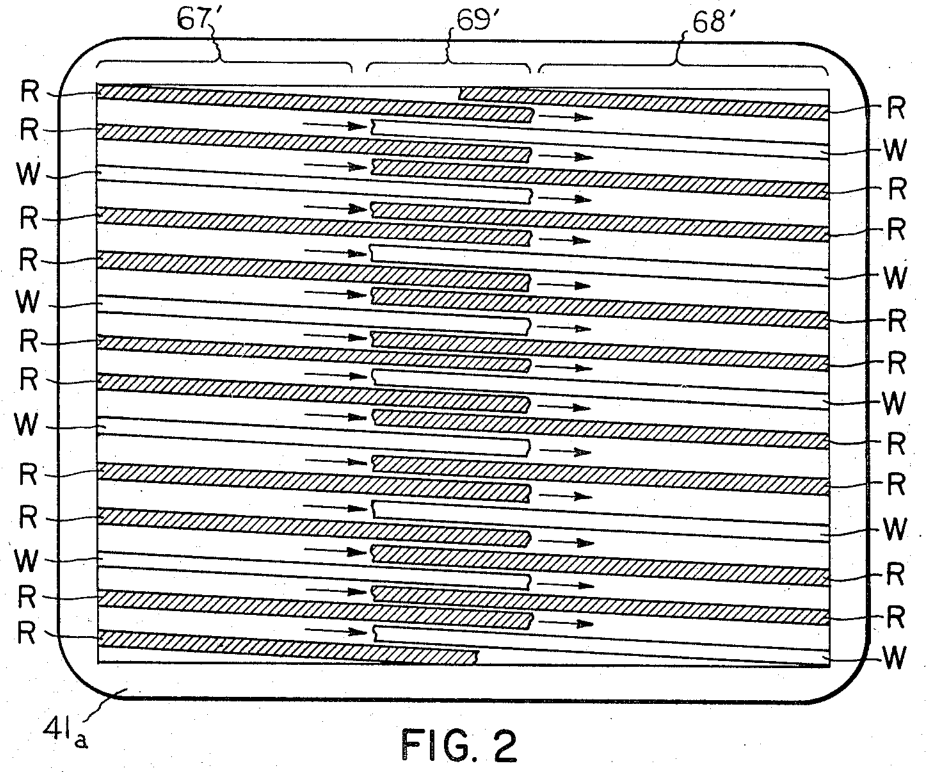
Figure 3:
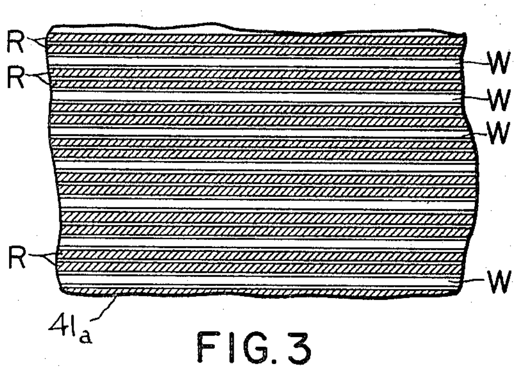
FIGURE 3 illustrates a fragment of a picture tube face evidencing improved ternary line-sequential scanning.
Figure 4:
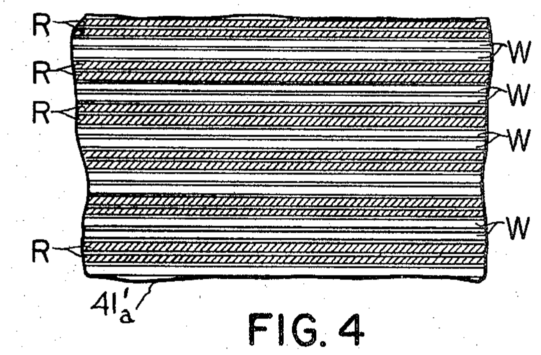
FIGURE 4 illustrates a fragment of a picture tube face evidencing the relatively coarse results of binary line-sequential scanning.

In FIGURE 2, the front face 41*a* of a picture tube such as that of the FIGURE 1 receiver 12 is depicted with the ternary line-sequential line traces exaggerated in thickness and illustrated on a coarse scale (a total of 27 lines, vs. the 525 lines making up a full raster in actual practice), as an aid to clarity. Lines of the first field, portions of which are embraced by bracketing 67′, are traced from left to right in the sequence red-red-white (R-R-W) from top to bottom, ending with half of the midline (the 14th, vs. the 263rd line of the usual 525-line raster). Lines of the second field, portions of which are embraced by bracketing 68′, begin with the other half of the midline and continue in the same sequence (R-R-W) without interruption until the second field is fully interlaced with the first to make up a full frame. Importantly the interlaced lines (the red lines being cross-hatched for distinctiveness in the illustration) are in the same R-R-W sequence, from top to bottom, as shown by the interlaced portions embraced by bracketing 69′. Because each field includes an integral multiple of three lines, plus 1½ additional lines, the total odd number of lines in the frame being an integral multiple of three, the described ternary groupings (R-R-W) of lines will fit the frame and will not require changes in the color sequencing or acceleration-voltage sequencing to preserve a stable R-R-W sequencing in the interlaced fields. A fragment of the same faceplate is shown in somewhat finer line detail in FIGURE 3, from which it will be evident that the ternary groupings of two red and one white line can, on a yet finer scale (example: 525 lines to a full frame), produce a relatively homogeneous appearance at normal viewing distances. Of course, the observer is not conscious of the separate white and paired red lines but, instead, perceives substantially full-color images across the full raster area in accordance with principles referred to earlier herein. A mere alternation of red and white line scans, in accordance with an orthodox approach to scanning, would inevitably result in interlaced linework of a R-R-W-W sequencing, as shown on a similar faceplate 41*a′* in FIGURE 4, and, although such reproductions would also be sensed in multiple colors, the four (two pairs of) lines required to develop color impressions produce a relatively course vertical resolution and tend to introduce undesirable relatively coarse horizontal linework into the color images. By way of distinction, the narrower ternary groupings of lines promote a significantly finer and advantageously higher-quality color resolution.

Figure 5:
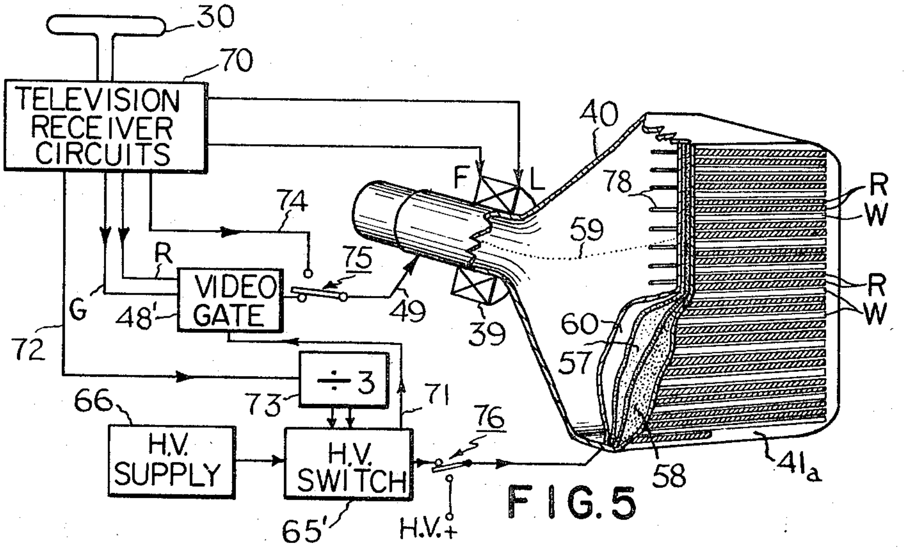
FIGURE 5 is a partly schematic and partly block-diagrammed representation of an improved television receiver based upon certain of the present teachings, and including a perspective view of a picture tube with portions broken away to expose constructional details.

The television receiver apparatus represented in FIGURE 5 corresponds functionally to that illustrated in connection with the system of FIGURE 1, and functional counterparts are thus identified by the same reference characters for the purpose of simplifying these disclosures. Block-diagrammed circuitry 70 embraces those networks other than the color- and voltage-gating components. As has been explained with reference to FIGURE 1, video gate 48 switches to the picture-tube control electrode structure the electrical signals related to the red and green lightness-distribution characteristics in the televised scene, the switching being at rates and in a predetermined synchronism which cause the traced lines to appear in the illustrated ternary-grouped R-R-W sequence. Preferably, switch 48 is an electronic gate and is triggered to shift its couplings of the applied red and green signals to the picture tube in accordance with the desired sequencing under control of gating pulses generated in the high-voltage switching network 65′ and applied thereto over coupling 71. Network 65′ is also preferably an electronic switch, operating to develop the needed high and low accelerating potentials synchronously from a D-C supply in response to control signals derived from horizontal sync pulses appearing in coupling 72 and processed by a divide-by-three electronic circuit 73. Detailed disclosures of typical embodiments of these electronic components are reported hereinbelow and, for the moment, are deferred while the general receiver operating characteristics are being considered. While a relatively low accelerating appears at anode 60, the innermore phosphor layer 57 is excited by electrons from beam 59, thereby emitting reddish light, and the outermore layer 58 remains substantially quiescent and unexcited, as shown by the two upper line-trace impingement conditions in FIGURE 6. The third (lowermost) trace involves penetration of the beam through the inner layer and into the outer layer 58, such that the greenish or cyanish emissions from the latter layer combine with the reddish emissions from the inner layer to produce resultant whitish emissions. Although the target layers are depicted as directly superimposed, it will be recognized that certain known optically translucent barrier or retardation layers (such as those of zinc sulfide) may be used between the emissive layers to aid in establishing an optimum accelerating-voltage threshold for the emissions of light by the two layers. The phosphor layers may also be of different thicknesses and may yield outputs of different brightnesses. Because there are twice as many red as white lines in the frames, the red-emitting phosphor may be permitted to exhibit lower brightness characteristics. Selection and application of the phosphors may be in accordance with established prior techniques and teachings in the art, and it should be understood that, although reddish- and cyanish-emitting phosphors are currently preferred, these may be replaced by others having different color-emission characteristics and yet producing the desired multi-color impressions in accordance with the principles referred to hereinabove. Accordingly, the designations "R" and "W" in the sequencings discussed herein should also be understood to embrace colors which are not necessarily limited to red and white, respectively, However, it is preferred that substantially whitish light be observable from the phosphor excitations, inasmuch as this provides the basis for compatibility with black-and-white, as well as color, reproductions. In the latter connection, it is an advantage that by merely holding the anode 60 at the higher potential, continuously, while applying the usual black-and-white video signals in coupling 74 (FIGURES 1 and 2) to the picture-tube control electrode, black-and-white reproductions are obtained on the same screen target. Switch 75 serves to make the connections from color or monochrome video channels to the picture tube, and, although conveniently illustrated as a manually-operated switch, may be replaced by an automatic equivalent such as a simple electromagnetic relay switch responding to electrical signals, from a conventional color-killer circuit, characterizing the presence or absence of color-burst signals in the received television signals. A fixed high accelerating voltage is likewise applied to anode 60 at such times, via switch 76 (FIGURES 1 and 5), whereby the electron beam impinges upon and excites both phosphor layers to develop whitish light outputs. This may be of the same automated type, also. An inner conductive screen or mesh 78, close to the target layers and maintained at a fixed accelerating potential, is useful in preserving essentially fixed accelerating conditions for the electron beam while undergoing deflections; misregistration of the images is thereby reduced, and the potential modulations on the more removed anode 60 then serve to alter the electron kinetic energies for purposes of exciting one or both of the phosphor layers. Other misregistration-compensation techniques may be practiced, instead.

It has been found that in the preferred red-red-white ternary line-sequencing receiver, operations in the black-and-white mode can produce overly cool tones as the result of dominating coolness of the emissions from the greenish outer layer. Uniquely, this effect may be offset or compensated by a reversal of the sequencing which occurs during color reproductions, such that the monochrome-mode reproductions are then also on a ternary line-sequential basis, coded white-white-red. For this purpose, the accelerating-voltage switch 65 (FIGURE 1) merely has its inputs to the commutator segments reversed, by a reversing switch 77, whereby the higher accelerating voltages persist during two line scans and the lower accelerating voltage merely during the third. At such times, the monochrome video is coupled to the control electrode structure via switch 75. The resulting monochrome images have the line formation appearing in FIGURE 7 and include fine red lines (every third line) which are not disturbing at normal viewing distances and which, instead, pleasingly warm the resultant picture tones. These effects may be advantageously realized through electronic reversals of the accelerating-voltage switching code.

The color television receiver system portrayed in FIGURE 8 includes front-end circuitry which is of conventional form, including the usual tuner 79, video IF stages 80, audio stages 81, video amplifier 82, sync separators 83, vertical oscillator and sweep circuitry 84, horizontal oscillator and sweep circuitry 85, horizontal flyback circuitry 86, and circuitry 87 which includes a 3.58 mc. oscillator, a reactance control and burst amplifier. However, the picture tube 40′, which is like the tube 40 referred to earlier herein and includes two phosphor layers 57′ and 58′ backed by an anode 60′ and a registration mesh 78′, is excited in the improved ternary line-sequential mode via other uncomplicated electronic networks including a simple single-axis demodulator 88, video gate **48*a* and video amplifier 48*b*, divide-by-three unit 73′, and the high-voltage switch and supply 65*a*. Inasmuch as only two color codings are required, the composite video signals applied to demodulator 88 from video amplifier 82 may be conveniently resolved into red-characterizing (R) and cyan-characterizing (C) electrical output signals by passing through separate gating channels those portions of the 3.58 mc. composite video which are of phases characterizing the red and cyan color content, respectively. As is shown in FIGURE 9, such demodulation may be performed with the aid of two simple units 88*a* and 88*b*, each of which includes a different one of the transistors, 88*c* and 88*d*, respectively, having its base excited by a different one of the oppositely-phased 3.58 (approx.) mc. outputs $\phi_1$ and $\phi_2$, respectively, from the 3.58 mc. oscillator 87*a*. The output signals $\phi_1$ and $\phi_2$ are substantially 180 degrees out of phase in relation to one another and, further, are synchronized in relation to the usual color burst signals such that they periodically render the transistors 88*a* and 88*b* conductive of the applied color-characterizing video signals only at such times as the latter 3.58 (approx.) mc. signals characterize the red and cyan conditions, respectively. This takes advantage of known attributes of the 3.58 mc. color-characterizing video signals, appearing in couplings 82*a* and 82*b*. For purposes of synchronizing the oscillator 87*a* with the color burst signals appearing in input coupling 87*b*, the phases of signals from the oscillator and from the burst amplifier 87*c* are compared by phase detector 87*d*, the outputs of the latter being used to regulate a reactance control circuit 87*e* which slaves the oscillator 87*a*. Such oscillator-synchronizing networks are of course well known in current color television systems, where they are used to provide signals for Q and I demodulator stages. Red- and cyan-characterizing output signals from units 88*a* and 88*b* are next gated to a conventional type of video amplifier 48*b*, and thence passed on to the cathode K of picture tube 40′ at proper times synchronized with the red and white line-scanning times. The synchronized gating of these output signals is performed in the gating network 48*a* which includes a transistor 89 which is biased at appropriate times to pass the red video signal to output coupling 90, and a transistor 91 which is at other appropriate times biased to pass the cyan video signal to the same output coupling. The needed biasing of gating transistors 89 and 91 are under control of a further transistor 92, which responds to an input of pulses applied to coupling 93 from the circuitry of FIGURE 10. These synchronized gating pulses are shown by waveform 94 in FIGURE 10, the shorter negative pulses 94*a* being effective to gate only cyan video signals to the picture tube control electrode structure, and the longer (substantially twice as long) positive pulses 94*b* being effecive to gate only the red video signals to the picture tube via amplifier 48*b***.

The FIGURE 10 network comprises the divide-by-three circuit 73′ in cooperative relationship with a high-voltage circuit **65*a* which generates the desired accelerating-voltage waveform 96 for the picture-tube anode 60′. As shown, the anode voltage is at a relatively high level, characterized by pulses 96*a*, during certain periods (between about times $t_1$ and $t_2$, for example) which correspond to the times when the cyan-characterizing video signals are applied to the picture tube control electrode structure. This voltage is also at a relatively low level, characterized by pulses 96*b*, during periods (between about times $t_2$ and $t_4$) which correspond to the times when the red-characterizing video signals are applied to the picture tube. Pulses 96*a* and 96*b* are respectively positive and negative in relation to a D-C voltage level 96*c* which is substantially that applied to terminal 97 from a suitable source. These pulses are developed with the aid of the secondary 98*b* of a transformer-type inductance unit 98 which has a center-tapped primary 98*a*. A D-C supply connection at primary tap 98*c* provides pulse excitations of the transformer primary halves at times controlled by the associated transistors 99*a* and 99*b*. The bases of these transistors receive short pulse excitations at times $t_1$ and $t_4$, as determined by the circuit 73′, and as shown by waveforms 100*a* and 100*b*, respectively. These short pulses at times $t_1$ and $t_4$ are produced by circuit 73′ in response to horizontal sync pulses applied to that circuit over coupling 101 (FIGURES 8 and 10) at each of the times $t_1$ through $t_4$. In its illustrated form, circuit 73′ is a relaxation oscillator involving a silicon controlled switch 102 and capacitor 103; horizontal synchronizing pulses applied via coupling 101 cause breakdown of the switch 102 and attendant sudden discharges of the capacitor for every third periodic pulse in the horizontal sync pulse train. Ordinarily, the times of capacitor discharge could be somewhat erratic without the slaving to the horizontal sync pulses; however, the latter pulses effectively add to the capacitor voltages at times such as $t_1$, $t_4$, etc., and are of sufficient value to insure that breakdown will occur exactly when intended, but not otherwise. The charging and discharging waveform is designated by reference character 104 and appears at the illustrated circuit point. When a pulse from circuit 73′ is applied to upper transistor 99*a* at time $t_1$, it causes a correspondingly brief flow of current through the upper half of primary 98*a*. The substantially zero impedance source which is then sensed by the primary effectively causes a shorting of the primary, and this is in turn sensed by the secondary, resulting in a high resonant frequency condition on the secondary side. This momentary resonant frequency condition involves the relatively small inductance (L) sensed at the secondary in combination with the capacitance (C), to ground, of the anode 60′, designated by dashed linework 105. Therefore, at time $t_1$ the secondary voltage rises swiftly, and in a substantially sinusoidal manner to the relatively high level 96*a*. At the same time, the lower transistor 99*b* is prevented from conducting by the inhibit pulse applied to its base. Once the high potential level 96*a* is reached at the anode 60′, it remains there until time $t_2$ because of the much higher resonant frequency condition which persists once the short current pulse applied through the upper half of the primary has disappeared. That is, until time $t_2$, the LC combination is that for a much lower frequency, the effective inductance (L) being much higher than before. A slight decay in level of voltage 96*a* (not illustrated) can occur before time $t_2$ is reached, although the anode voltage is substantially of the desired level. At time $t_2$, transistor 99*b* is switched on by a pulse of the type shown in waveform 106 applied to its emitter and derived from the flyback pulses of waveform 107 appearing in coupling 108 from the horizontal flyback circuit 86 (FIGURE 8). Therefore, by actions similar to those described for the conditions at time $t_1$, the lower half of the primary 98*a* draws current at time $t_2$, in a direction opposite to that considered earlier, and induces secondary voltages swiftly dropping the output to the relatively low voltage level 96*b*. When the primary current pulse disappears, the higher inductance (L) effective in the secondary resonant circuit maintains the desired lower voltage (with a negligible rise not illustrated) for a double-length interval ($t_2$ to $t_4$). At time $t_2$, the flyback-related pulse applied to transistor 99*b* cannot change its state because the lower diode 109 is in a blocking state which keeps the transistor collector at a substantially zero level. Not until time $t_4$, when another pulse causes the upper transistor 99*a* to conduct, does the cycle repeat itself. As a result, the desired high anode voltage 96*a* is produced during one line scan (time $t_1$ to $t_2$) when the whitish output from the target phosphors is to be created, and the desired low anode voltage 96*b* is produced during the ensuing two line scans (time $t_2$ to $t_4$) when the reddish output is to be created by emissions from the inner phosphor layer alone. Gating pulses 94 of comparable synchronized periodicities, but reversed polarities, are conveniently taken from a portion 98*d* of the secondary winding. For the aforementioned alternative WWR mode of monochrome operation, the operating conditions in circuit 65*a* need only be reversed, as by reversing the settings of switch halves 106*a* and 106*b***, either manually, or automatically under control of the aforementioned circuitry based on known color-killer provisions.

There are numerous departures which may be made from the specific practices and constructions which have been thus far described, within the purview of the same teachings. Improved systems, such as closed-circuit systems, may involve transmissions based on but two color codings. Phosphor-poisoning techniques, barrier layers, striping of phosphors and masking elements, and the like, may be employed. The picture tube may be of a type involving more than one electron gun. Although red- and green-emitting phosphors have been discussed, others may be chosen with useful results, such as orange- and cyan-emitting phosphors, or others which have the required relatively long and short visible wavelength characteristics known to produce multiple color impressions from a binary color-coded system in accordance with established principles. As has been stated herein, the 525-line system is not a limiting case, though currently preferred; it matters not that not all of the lines are actually observed, with some being masked. Beam spot sizes for the various line traces may be of the same or of different values, and need not be purely circular. Advantage may be realized from the fact that two successive lines of the ternary groupings are of the same color, because this increases the effective brightness in terms of that color (example: red); hence, the phosphor responsible for that color need not have as high a brightness-producing capability, and/or may be excited at a much lower voltage level. If the balck-and-white reproductions are not to have the reverse ternary codings, the accelerating-voltage level for that mode of operation may be selected for optimum tone of reproduction jointly by the two phosphors involved. Modulation other than by way of accelerating potentials may be used to promote the different emissions needed, as by way of beam currents, for example, where the phosphor material responds appropriately. Accordingly, it should be understood that the embodiments and practices described and portrayed have been presented by way of disclosure, rather than limitation, and that various modifications, substitutions and combinations may be effected without departure from the spirit and scope of this invention in its broader aspects.

What I claim as new and desire to secure by Letters Patent of the United States is:

1. Television apparatus for reproducing a subject as a display in color, comprising means for sequentially tracing the lines of a raster selectively in terms of visible light of different predetermined wavelengths, and means programming said tracing means to repeatedly trace in visible light of first wavelengths for the duration of two line scans information characterizing the lightness distribution in a televised scene as it appears in terms of first predetermined light wavelengths and then in visible light of second wavelengths for the duration of one line scan information characterizing the lightness distribution in the same scene as it appears in terms of second predetermined light wavelengths.

2. Television apparatus as set forth in claim 1 where said visible light of second wavelengths includes said visible light of first wavelengths, and wherein said visible light of second wavelengths comprises substantially whitish light.

3. Television apparatus as set forth in claim 2 wherein said visible light of first wavelengths comprises substantially reddish light.

4. Television apparatus for reproducing a subject as a display in color, comprising cathode ray tube means having electron gun means and a target assembly, said target assembly including phosphor means covering a raster area and emissive of visible light of different predetermined wavelengths responsive to impingements of electrons from said electron gun means under different electron-beam impingement conditions, means for tracing successive lines of said raster with electrons from said gun means, and means controlling the impingements of electrons from said gun means upon said target assembly for the duration of two successive line traces both to produce one of said different impingement conditions and to trace on said raster in visible light of first wavelengths the information characterizing lightness distribution in a televised scene as it appears in terms of first predetermined light wavelengths, said controlling means further controlling the impingements of electrons from said gun means upon said target assembly for the duration of a third successive line trace following said two successive line traces both to produce another of said different impingement conditions and to trace on said raster in visible light of second wavelengths the information characterizing lightness distribution in the same televised scene as it appears in terms of second predetermined light wavelengths.

5. Television apparatus as set forth in claim 4 wherein said controlling means repeatedly produces the line traces in said visible light of first wavelengths followed by the trace in said visible light of second wavelengths, whereby images are traced on said raster in terms of successive ternary groupings of two line traces in said visible light of first wavelengths and a third line trace in said visible light of second wavelengths.

6. Television apparatus as set forth in claim 5 wherein said means for tracing successive lines of said raster comprises means scanning said lines according to a field-interlaced schedule and wherein each frame comprises an odd number of lines which is an integral multiple of three.

7. Television apparatus as set forth in clam 6 wherein each field includes the same number of substantially horizontal lines comprising an integral multiple of three plus one and one-half lines.

8. Television apparatus as set forth in claim 6 wherein said visible light of first wavelengths and said visible light of second wavelengths together produce substantially whitish light.

9. Television apparatus as set forth in claim 8 wherein said phosphor means of said target assembly includes first phosphor material emissive of said visible light of first wavelengths, and second phosphor material emissive of said visible light of second wavelengths.

10. Television apparatus as set forth in claim 9 wherein said visible light of first wavelengths comprises substantially reddish light, and wherein said visible light of second wavelengths comprises susbtantially greenish light.

11. Television apparatus as set forth in claim 9 wherein said second phosphor material comprises a phosphor layer substantially coextensive with said raster area, and wherein said first phosphor material comprises a phosphor layer coextensive with said raster area and disposed nearer said electron gun means than said second phosphor material.

12. Television apparatus as set forth in claim 9 wherein said first phosphor material is emissive of said visible light of first wavelengths upon impingements of electrons on said target assembly of at least a first predetermined kinetic energy, wherein said second phosphor material is emissive of said visible light of second wavelengths upon impingements of electrons on said target assembly of at least a second predetermined kinetic energy higher than said first predetermined kinetic energy, and wherein said different impingement conditions comprise different kinetic energy conditions of said electrons from said gun means.

13. Television apparatus as set forth in claim 12 wherein said controlling means includes means producing in said cathode ray tube means a first relatively low electron-accelerating potential sufficient to produce electron kinetic energies of at least said first predetermined kinetic energy and less than said second predetermined kinetic energy for said duration of said two successive line traces and producing a relatively high electron-accelerating potential sufficient to produce electron kinetic energies of at least said second predetermined kinetic energy for said duration of said third successive line trace.

14. Television apparatus as set forth in claim 13 wherein said means producing said first and second electron-accelerating potentials comprises synchronized high-voltage switching means alternately applying to an accelerating anode of said cathode ray tube means said relatively low accelerating potential for said duration of said two successive line traces and said relatively high accelerating potential for said duration of said third successive line trace.

15. Television apparatus as set forth in claim 14 wherein said apparatus includes means deriving horizontal synchronizing pulses from received television signals, and wherein said switching means includes means synchronizing the alternate applications of said relatively low and high potentials with said horizontal synchronizing pulses, whereby said durations are synchronized with full horizontal line traces on said raster of said cathode ray tube means.

16. Television apparatus as set forth in claim 13 wherein said apparatus includes means producing at least two electrical signals each related to a different one of the lightness distributions in a televised scene as they appear in terms of different predetermined light wavelengths, and wherein said controlling means includes synchronized switching means for alternately applying to the control electrode structure of said electron gun means as electron-beam intensity-modulation signals first one of said electrical signals for said duration of said two successive line traces and then another of said electrical signals for said duration of said third successive line trace.

17. Television apparatus as set forth in claim 16 wherein said apparatus includes means deriving horizontal synchronizing pulses from received television signals, and wherein said switching means includes means synchronizing the alternate applications of said one and said other of said electrical signals to said control electrode structure with said horizontal synchronizing pulses, whereby said applications and intensity modulations of electrons are synchronized with full horizontal line traces on said raster of said cathode ray tube means.

18. Television apparatus as set forth in claim 17 wherein said one and said other of said signals characterize the lightness distribution in a televised scene as they appear in terms of substantially reddish and substantially greenish light, respectively.

19. Television apparatus as set forth in claim 13 further including means for selectively applying to an accelerating anode of said cathode ray tube accelerating potential of at least said relatively high electron-accelerating potential for the duration of at least two of every three successive traces, and further comprising means for selectably applying to the control electrode structure of said electron gun means as electron-beam intensity-modulation signals electrical signals characterizing the luminance of the televised scene, whereby said target assembly of said cathode ray tube means may selectably reproduce monochrome television images.

20. Television apparatus as set forth in claim 15 wherein said synchronized switching means includes means for selectably reversing the applications of said accelerating potentials and thereby alternately applying said relatively high accelerating potential for the duration of two successive line traces and said relatively low accelerating potential for the duration of said third successive line trace, and further comprising means for selectably applying to the control electrode structure of said electron gun means as intensity-modulation signals electrical signals characterizing the luminance of the televised scene, and wherein said visible light of first wavelengths comprises substantially reddish light, whereby said target assembly of said cathode ray tube means may selectably reproduce warm-toned monochrome television images in terms of ternary groupings of lines including two successive lines traced in substantially whitish light and a third successive line traced in substantially reddish light.

21. The method of producing television images in color which comprises producing at least two electrical signals each related to a different one of the lightness distributions in a televised scene as they appear in terms of different predetermined light wavelengths, and translating the two electrical signals into first and second visible light images having different visible wavelength contents by repeatedly line-sequentially tracing lines of the first image on a picture-tube target for the duration of two successive line scans and lines of the second image for the duration of the succeeding third line scan.

22. The method of producing television images in color which comprises line-sequentially scanning the target of a picture tube while repeatedly first modulating the picture tube for the duration of two successive line scans to produce visible light outputs of first wavelengths related to corresponding portions of the lightness distribution in a televised scene as it appears in terms of first predetermined light wavelengths and then modulating the picture tube for the duration of a third line scan to produce visible light outputs of second wavelengths related to corresponding portions of the lightness distribution in the same televised scene as it appears in terms of second predetermined light wavelengths.

23. The method of producing television images in color as set forth in claim 22 wherein said visible light outputs of second wavelengths include said visible light outputs of first wavelengths, and wherein said visible light outputs of second wavelengths comprise substantially whitish light.

24. The method of producing television images in color as set forth in claim 23 wherein said visible light outputs of first wavelengths comprise substantially reddish light.

25. The method of producing television images in color as set forth in claim 22 wherein said modulating of the picture tube to produce the said visible light outputs is performed in synchronism with the line-sequential horizontal scanning of the picture tube, whereby the said light outputs are synchronized with full horizontal lines traces on the target of the picture tube.

26. The method of producing television images in color as set forth in claim 25 wherein said modulating of the picture tube to produce the said visible light outputs includes synchronously alternating the electron-beam accelerating potentials of the picture tube between a relatively high level for the duration of the two successive line scans and a relatively low level for the duration of the third line scan, and wherein said step of line-sequentially scanning the target of a picture tube includes the steps of directing intensity-modulated electrons upon a first phosphor emissive of said visible light outputs of first wavelengths while intensity-modulating the electrons in accordance with the lightness distribution of a televised scene as it appears in terms of said first predetermined light wavelengths, and directing intensity-modulated electrons upon both the first phosphor and a second phosphor emissive of said visible light outputs of second wavelengths while intensity-modulating the electrons in accordance with the lightness distribution of the same scene as it appears in terms of said second predetermined light wavelengths.

No references cited.

RALPH D. BLAKESLEE, *Primary Examiner.*

R. MURRAY, *Assistant Examiner.*

U.S. Cl. X.R.

178—5.4